Oct. 27, 1964    A. DE ANGELIS    3,153,811
FOOD FORMING DEVICE
Filed March 14, 1963

INVENTOR
ANTHONY DE ANGELIS

BY *Charles R. Fay,*
ATTORNEY

United States Patent Office 3,153,811
Patented Oct. 27, 1964

3,153,811
FOOD FORMING DEVICE
Anthony De Angelis, 254 Shrewsbury St.,
Worcester, Mass.
Filed Mar. 14, 1963, Ser. No. 265,172
1 Claim. (Cl. 17—32)

This invention relates to a feed forming device in the nature of a press, and the principal object of the invention is to provide such a device which is very easy to operate, is easily cleaned, and from which the formed comestible is easily abstracted as a patty or a ball.

Further objects of the invention include the provision of a food press comprising in general a cylindrical member having a closed end, said cylindrical member being adapted to be held in upright position with the closed end uppermost, there being a separate food-forming member of annular form surrounding the cylindrical member and being held in uppermost position, i.e., to form a rim in cooperation with said closed top end, by means of a resilient member which preferably surrounds the cylindrical member and has the required strength to hold said annular member normally in such association with the closed end, thus forming a food press forming part or die; and the provision of the same with a hinged lid or cover member which forms the other press part to form the comestible, pressure being exerted by the user on the cover to compress or form the comestible within the rim; said lid or cover then being opened, and the annular member being depressed leaving the formed comestible on the closed end of the cylindrical member in easy position to be easily removed without the necessity of digging in past a rim extending about the comestible, as in the prior art.

Another object of the invention resides in the provision of a device of the class described which may be used to form patties in flat or spherical form as examples of which are hamburgers and meatballs.

The invention further relates to arrangements and combinations of parts which will be hereinafter described and more particularly set forth in the appended claims.

Reference is to be had to the accompanying drawings, in which

Figure 1:
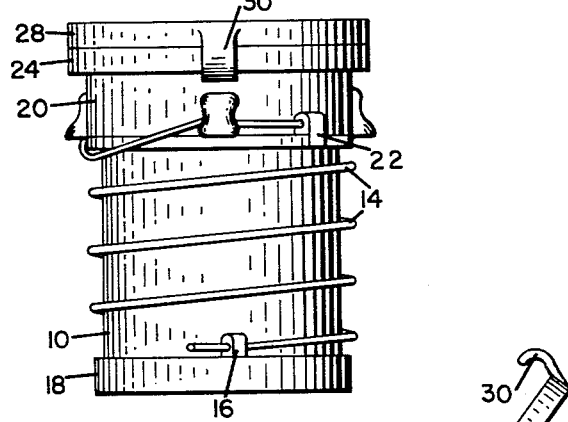
FIG. 1 is a view in elevation showing the device with the cover or lid closed.

In carrying out the present invention, there is provided a cylindrical member 10. This member has at least one closed end 12 and is surrounded by a spring 14 which is provided with an anchor at the lower end of the cylindrical member as at 16. The anchor 16 can conveniently be placed on a rim or the like 18.

Figure 2:
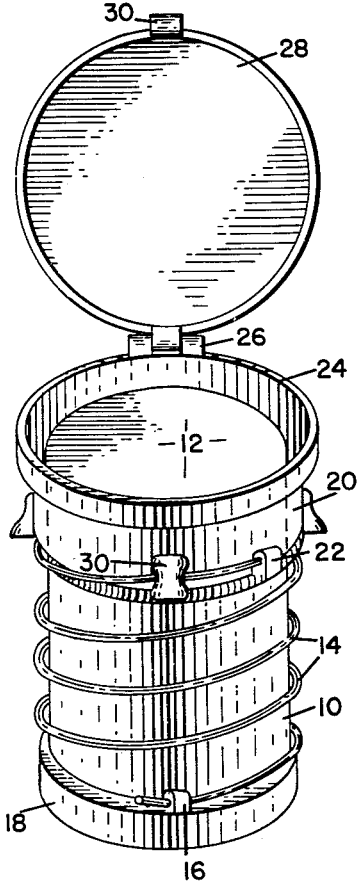
FIG. 2 is a perspective view showing the cover open.
Figure 3:
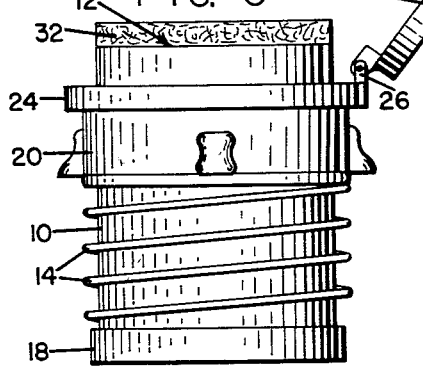
FIG. 3 is a view similar to FIG. 1 but showing the patty formed and in condition to be removed.

Slidably mounted on the cylindrical member there is provided an annular member 20 having a boss or the like 22 to which the other end of the spring 14 is attached so that the annular member 20 is generally held in the upwardmost position shown in FIGS. 1 and 2. The annular member 20 thus being held has a rim portion 24 which extends above the closed end 12 of cylinder 10 and it also has a portion extending downwardly along the side of the cylindrical member. The annular member 20 can be moved downwardly for instance to the position shown in FIG. 3, thus clearing the closed end 12 of the cylindrical member 10 but normally the rim 24 extends thereabove and is yieldingly held in this position by the spring.

At the upper edge of the member 24 there may be provided a hinge or the like 26 to which may be pivotally connected a lid or cover member 28. If desired this cover member 28 may have some kind of a latching means or snap 30 by which it may be latched with respect to the rim 24 but this is not necessary to the successful operation of the device. The lid or cover 28 is coextensive with the rim 24.

In the use of the device, the lid or cover is opened as shown in FIG. 2 and the food is placed on the closed end 12 of the cylindrical member 10, being encompassed by the rim 24 of the member 20. The cover 28 is then brought down as in FIG. 1 and wherever pressure may be desired to be impressed on the food being formed may be applied manually by the operator because the entire unit 20 together with cover 28 in closed position can be moved down against the action of the spring 14 to some extent, compressing the food and forming a patty.

When the operator has formed the patty in this manner, it is merely necessary to open the cover 28 and release the pressure on the member 20. This will allow the member 20 to spring up slightly, depending upon whether it has been depressed by the operator; then with the cover open, the member 20 is depressed to the FIG. 3 position, whereupon the patty which is indicated by the reference numeral 32 is free and clear and may be easily slipped off the top 12 of cylindrical member 10 by means of a spatula or it may be merely picked up by the operator. Upon release of member 20 the same will rise to the FIG. 2 position, the cover 28 still being open, and the device is ready for the next patty.

Figure 4:
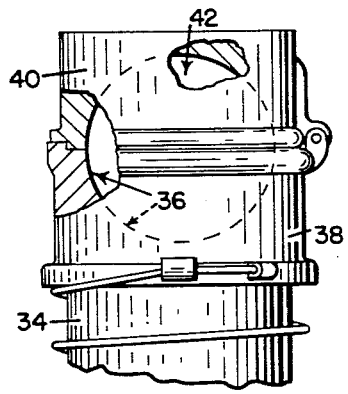
FIG. 4 is a view in front elevation illustrating a modification, parts being broken away and in section.

In FIG. 4 the construction is the same but the top of the cylindrical member indicated at 34 is provided with a substantially semispherical indentation as indicated at 36. The lower die member 38 may be substantially the same as member 20 and so is the spring, etc., but the top forming member 40 has a cavity 42 complementary to that at 36 so that when pressure is applied in a downward direction as above described with reference to FIG. 2 the comestible will be formed substantially into a sphere.

Having thus described my invention and the advantages thereof, I do not wish to be limited to the details herein disclosed, otherwise than as set forth in the claim, but what I claim is:

A food-forming press comprising a cylindrical member, a closed end on said cylindrical member, said cylindrical member being adapted to be mounted with the closed end up, a separate, slidable annular member surrounding the cylindrical member, said annular member having a height less than the height of the cylindrical member, resilient means normally maintaining said annular member adjacent the closed end of the cylindrical member, the resilient means including a spring wound spirally about the cylindrical member, said spring having a pair of ends, means anchoring one spring end to the cylindrical member at the end opposite the closed end thereof, and anchoring means on said annular member securing the opposite end of said spring, said annular member including a rim portion normally extending beyond the closed end of the cylindrical member, a cover pivotally mounted on the rim portion, the closed end of the cylindrical member and the upstanding rim forming a food-forming die, whereby pressure exerted on the cover presses the material in the die, said annular device being retractable with the cover closed against the action of the resilient means by manual pressure on said cover in a direction toward the closed end of the cylindrical member, and said cover being open, the annular member is depressible against the action of the spring to a greater degree to completely clear the closed end and the comestible formed in the press whereby the comestible is completely free of the annular member and the cover, and is easily removed with a spatula.

References Cited in the file of this patent
UNITED STATES PATENTS

| | | |
|---|---|---|
| 1,808,993 | Murray | June 9, 1931 |
| 2,191,921 | Ziringer | Feb. 27, 1940 |